Sept. 29, 1959 J. L. BOWER ET AL 2,906,934

MULTIPLE LINEAR RANGE ERROR DECODER

Filed Feb. 28, 1957 2 Sheets-Sheet 1

INVENTORS.
JOHN L. BOWER
WILTON R. ABBOTT
BY Allan Rothenberg
ATTORNEY

MULTIPLE LINEAR RANGE ERROR DECODER

Filed Feb. 28, 1957

2 Sheets-Sheet 2

INVENTORS.
JOHN L. BOWER
WILTON R. ABBOTT
BY Allan Rothenberg
ATTORNEY 2,906,934

MULTIPLE LINEAR RANGE ERROR DECODER

John L. Bower, Downey, and Wilton R. Abbott, Whittier, Calif., assignors to North American Aviation, Inc.

Application February 28, 1957, Serial No. 643,134

8 Claims. (Cl. 318—28)

This invention relates to error decoders and more particularly to improvements in decoders of the type described in Patent 2,537,427 issued January 9, 1951 to E. Seid et al. for "Digital Servo."

Digital servos of the type described in the above mentioned patent may be utilized for the control of a machine tool in accordance with a predetermined program in the form of a series of control pulses. The normal rate of change of the mechanical output of such servos may be relatively slow whereby the mechanical output may closely follow the pulse input and the normal error stored in the counter will remain relatively small. However, for sudden stops or turns of the controlled machine tool, a relatively rapid change of mechanical output of the servo is required whereby the counter must be able to handle a large error on the occurrence of such rapid changes. To design the digital to analog error converter of such digital servos for the maximum anticipated range while at the same time satisfying the precision requirements of the normal small error operation, may call for unreasonable component tolerances. A slight drift in the value of a summing resistor connected to one of the higher rank stages of the counter introduces as much voltage or current into the summing network as does the introduction of an additional number of pulses into a lower rank stage of the counter. Therefore, extreme precision of the components of higher rank stages is normally of considerable importance.

The present invention substantially eases the rigid tolerances which would be required of the high rank stage components of the digital to analog converter without sacrificing either small error range precision or large error range linearity. In accordance with the principles of the present invention, the decoder is divided into two or more sections. These may be simply a low range section and a high range section. All but one or more of the higher rank stages of the counter comprise the low range section while all of the counter stages comprise the high range section. Means are provided for shifting the decoder from its low range section to its high range section when a large error occurs or is anticipated. In a disclosed arrangement this shift is effected by selectively coupling or decoupling the analog output of the highest rank stage or stages to the analog summing network of the low range counter section. Thus, for small error operation the summing elements of the high range stages are disconnected and thus produce no effect upon the output of the rest of the summing network. For large error operation, all of the summing elements of the counter are operable whereby the range of the counter is substantially extended. Thus the decoder is linear in both low and extended range and at all times yields an analog output which is proportional to the number stored in the counter.

It is an object of this invention to improve the accuracy of digital to analog converters.

Another object is the improvement of the operation of digital servos.

Still another object is the improvement of the component tolerances required of a digital to analog converter.

A further object is to extend the range of a digital to analog converter without compromising low range precision or high range linearity.

Still another object is the provision of a multiple range error decoder having a linear output in all of its ranges.

These and other objects of the invention will become apparent from the following description taken in connection with the accompanying drawings, in which Fig. 1 illustrates a digital servo embodying the principles of this invention.

Figure 1:
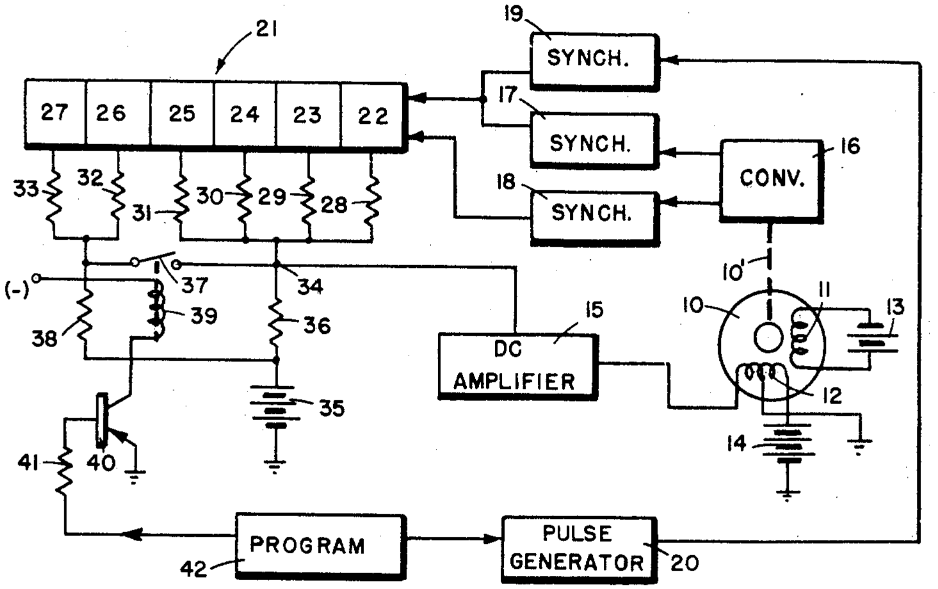

Shown in Fig. 1 is a motor 10 having armature winding 11 and field winding 12 energized as shown by sources of fixed potential 13, 14, and the output of amplifier 15. The motor direction is controlled by the direction of current flowing in winding 12 which itself depends upon the magnitude of the output of amplifier 15 relative to the magnitude of the potential source 14. Shaft 10' of motor 10 provides the desired output mechanical movement of the servo and also provides a mechanical input to the mechanical motion-to-pulse converter or tachometer 16 which supplies adding or subtracting pulses of a number proportional to such mechanical input to synchronizers 17 and 18 which may be of the type disclosed in Patent No. 2,552,968 for "Random Pulse Synchronizer" issued to Walter Hochwald on May 15, 1951. Synchronizer 19 similar to synchronizers 17 and 18 receives input or control pulses from pulse generator 20. Elements 10 through 19, inclusive, may be substantially similar to the corresponding elements more particularly described in Fig. 9 of the above mentioned Patent No. 2,537,427 to Seid et al. The pulse outputs of synchronizers 17, 18, 19 are fed to the first stage of the reversible binary counter 21 comprising bistable counter stages 22, 23, 24, 25, 26, and 27 which may be individually and collectively similar to the counter stages shown in Fig. 7 of the above mentioned patent to Seid et al. Each counter stage has connected thereto a digital to analog converting or summing resistor 28, 29, 30, 31, 32, 33. In accordance with the present invention the summing network is divided into two sections. Resistors 28 through 31 comprise the low range section and are connected together at the output terminal 34 of the digital to analog conversion network. A bias current or potential is provided at terminal 34 by a source of fixed potential 35 and bias resistor 36 whereby the low range section of the decoder is effectively biased about its mid point. The highest rank stages 26 and 27 of the counter are similarly provided with summing resistors 32, 33 which are connected to output terminal 34 through switch 37. Auxiliary bias resistor 38 is connected between resistors 32 and 33 and the bias source 35. Normally open switch 37 is closed by the energization of relay coil 39 which is connected in the output circuit of an amplifier shown as transistor 40. A negative collector supply voltage is provided from a source (not shown) through coil 39. The emitter of the transistor is grounded while the input is supplied to the base through resistor 41 from programming apparatus 42. Programmer 42 also supplies a signal to pulse generator 20 to control the pulse output thereof in accordance with the predetermined desired mechanical output of the servo system. This program signal controls and varies the number of pulses produced by the pulse generator 20 and will vary the pulse repetition rate thereof. For programmed sudden stops or turns of a machine to be controlled by the servo there is effected a sudden change in the pulse repetition rate of the control pulses supplied to synchronizer 19. Such sudden change in repetition rate of control pulses produces a large error input to counter 21 and at this time the programmer is programmed to cause the amplifier 40 to conduct and close switch 37.

Figure 2:
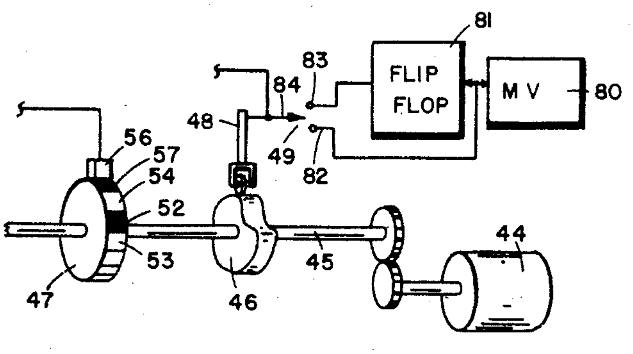
Fig. 2 illustrates an exemplary mechanization of portions of the system of Fig. 1.

The specific details of the programmer 42 and pulse generator 20 are not the subject of this invention and may comprise any suitable known arrangement for synchronizing the feeding of a signal to normally non-conducting amplifier 40 together with or just prior to a sudden change of pulse repetition rate. In fact, a suitable switch for energizing amplifier 40 may be manually operated just prior to operation of a manual control which effects a rapid change in the pulse repetition rate of the pulse generator. An exemplary mechanization of a suitable programming apparatus is shown in Fig. 2 and comprises a constant speed motor 44 driving through suitable gearing a shaft 45 on which are mounted a program cam 46 and a commutator 47. Cam 46 drives an arm 48 which is connected to actuate a switch 49 which controls the pulse generator 20. An exemplary variable or multi-frequency pulse generator may comprise an oscillator or free-running multivibrator 80 which feeds to a frequency dividing bistable flip-flop 81 and to switch terminal 82 a train of suitably shaped pulses of predetermined frequency or repetition rate. The output of flip-flop 81 at switch terminal 83 is a train of pulses at some submultiple such as one half of the frequency of the output of multivibrator 80. Movable switch arm 84, actuated by cam 46 and arm 48, is connected to feed the pulse train at either switch terminal to synchronizer 19 in accordance with the program cut on the cam. Obviously, a multi-position switch could be used in conjunction with additional frequency dividing flip-flops to provide a number of selectable frequencies greater than two. Stopping of the controlled machine may be effected by decoupling switch arm 84 from both terminals 82, 83. The commutator 47 includes a brush 56 and a plurality of sections 52, 57 which are connected to a suitable source of negative potential. The alternate sections 53, 54 of the commutator 47 may be grounded. Brush 56 is connected to input resistor 41 of amplifier 40 whereby when the brush is in contact with grounded sections 53, 54, the amplifier 40 is cut off and switch 37 is open. When the brush is in contact with the sections 57, 52, a negative signal is fed to the amplifier input whereby conduction occurs through the coil 39 and the switch is closed. Sections 57 and 52 of the commutator are arranged to cause operation of the switch together with or just prior to a movement of the arm 48 as effected by the cam 46.

Figure 3:
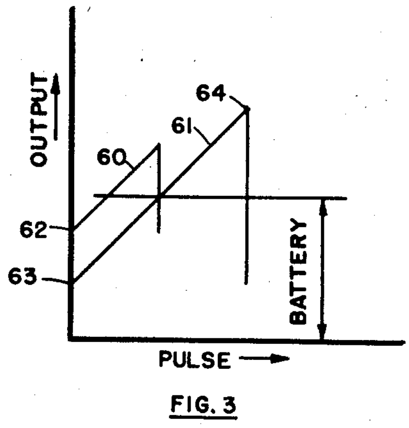
Fig. 3 is a graphic illustration of the operation of the decoder of Fig. 1.

As indicated in Fig. 3 the decoder is effectively biased about its mid point by biasing means including the source 14, source 35 and resistor 36 in low range operation. Curve 60 indicates the relation between the analog output of the low range converter section and a continuously adding series of pulses supplied thereto. The bias is so chosen that the current supplied by battery 14 is equal and opposed to the current supplied by amplifier 15 when the counter has stored therein a number which is substantially mid way between the lowest and highest numbers which may be stored in the low range section. Thus, the converter in low range operation has a maximum positive or negative capacity equal to approximately half of the number of pulses required to actuate all of the low range counter stages. When switch 37 is closed to couple the summing resistors 32, 33 of the highest rank stages 26, 27 to the output terminal 34, the counter capacity is quadrupled. Curve 61 indicates the counter capacity doubled by the coupling solely of resistor 32 to terminal 34. For the showing of curve 61 it is assumed that counter stage 37 and resistor 33 are not present. It will be seen that in order to maintain the zero reading of the decoder at the mid point of the extended range counter, the bias must be decreased. This is effected by the auxiliary bias resistor 38 which is connected in parallel with bias resistor 36 when the switch is closed, thereby dropping the minimum analog output of the decoder from point 62 to point 63. The analog output of the decoder in extended range will then vary between a level indicated at 63 and the maximum level indicated at point 64, while the analog output at the mid point of the counter range, the zero range of the decoder, remains equal (after amplification) and opposite to the signal provided by battery 14. Thus the switch 37, when open, eliminates any effect of inaccuracy of the relatively small resistors 32 or 33 on the decoder output while, when the switch is closed, the counter operates with all of its stages to provide an analog output which remains proportional to the number stored in the counter throughout the extended range thereof.

Figure 4:
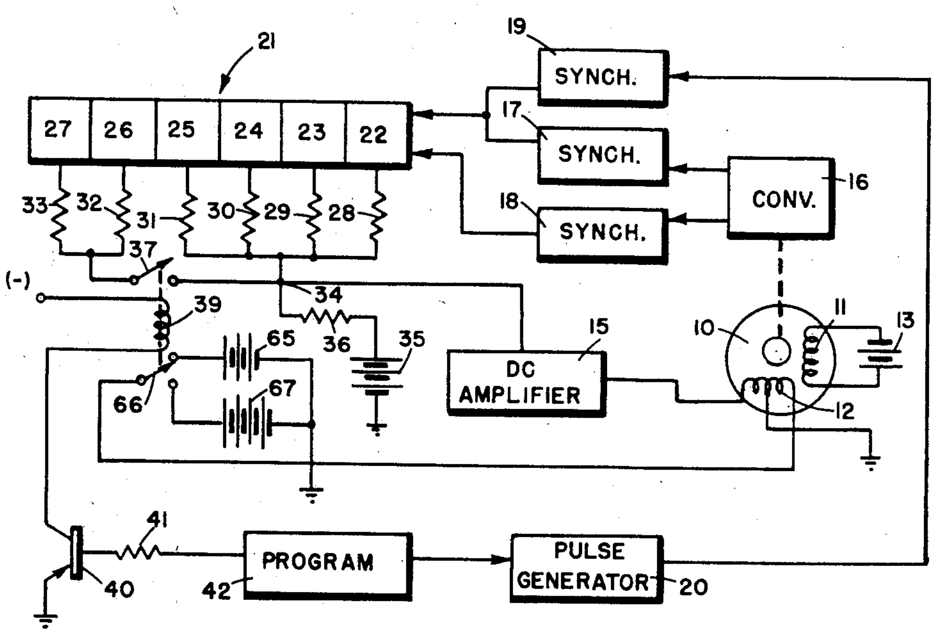
Fig. 4 is a modification of the apparatus of Fig. 1.
Figure 5:
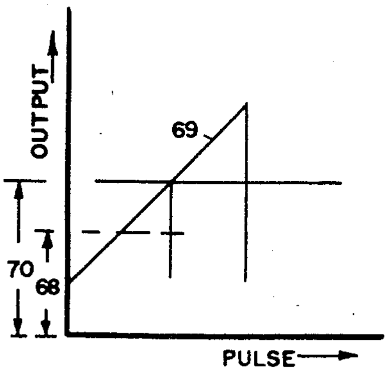
Fig. 5 is a graphic illustration of the operation of the decoder of Fig. 4.

Shown in Fig. 4 is a modified means for varying the mid point bias when the counter is shifted into extended range. In this instance the auxiliary bias resistor 38 is omitted and the shift in bias is provided by changing the bias supplied to motor winding 12. The circuit is otherwise the same as that of Fig. 1. In low range operation the switch 37 is opened and the winding 12 is connected to potential source 65 through switch 66. Energization of coil 39 actuates both switches 37 and 66 whereby a larger potential source 67 is connected to winding 12 for extended range operation. This bias arrangement is illustrated in Fig. 5 wherein battery 65 provides a bias magnitude indicated at 68 which is substantially at the mid point of the analog output of the low range counter section. Actuation of switches 37 and 66 provide the extended range analog output 69 which has an unchanged minimum value and a doubled maximum value (with an addition of but a single extended range counter stage). In this case the mid point of the extended range analog output has increased to a value indicated at 70 and similarly the current supplied to winding 12 from the extended range source 67 has been increased to maintain a net zero current in winding 12 at the mid point of the extended range counter.

It is to be understood that the number of stages shown in low and high range sections and additionally the disclosed number of sections is exemplary only since any desired number of stages may be utilized in the low range section and either one, two or more extended range elements such as 26 and 27 may be utilized to either double, quadruple, or even further extend the error range without sacrificing linearity. It will be readily appreciated that more than two error ranges could be provided simply by making provision for additional higher rank counting stages having the analog output thereof switch coupled to terminal 34 and causing operation of switch 37 and such additional switches in sequence as the counter range is progressively extended. It will be readily appreciated that the switch 37 could be actuated by a signal derived from the counter itself when the number stored in the low range is of a predetermined magnitude. The disclosed external actuation of the switch 37 is preferred, however, since it facilitates anticipation of the need for large error operation.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Servo means for monitoring electrical input pulses comprising means for producing a number of electrical pulses proportional to the output of said servo means, electronic counter means for continuously counting the difference between said input pulses and said number of pulses, said counting means including a plurality of normally operable counting elements and at least one normally inoperable element, means for operatively connecting said normally inoperable element with said normally operable elements to extend the maximum range of said counter means when said difference exceeds the maximum range of said normally operable counting elements, and means responsive to said counter means for producing an output proportional to said counted difference in said extended maximum range.

2. A servo system for producing an output mechanical movement as a predetermined function of an electrical input signal comprising means for deriving an electrical output signal bearing a predetermined relation to said mechanical output, comparator means for generating an error signal proportional to the difference between said input and output signals, and means responsive to said error signal for effecting said mechanical output, said comparator means having a low range linear error capacity and means synchronized with rapid changes of said input signal for changing said linear error capacity.

3. A servo system comprising an electrical to mechanical converter for producing a mechanical output and an electrical output as a predetermined function of said mechanical output, a source of variable input signal having at least two different rates of variation, comparator means responsive to said electrical output and said input signal for producing an error signal linearly related to the difference between said electrical output and said input signal, means responsive to said error signal for actuating said converter, said comparator means having at least two linear error ranges, and means for shifting said comparator means from one of said ranges to the other in accordance with a shift of said input signal from one of said rates of variation.

4. A multiple range error decoder comprising a plurality of bistable counter elements, said elements including a low range group of elements of successively increasing significance and at least one high range element coupled with the element of greatest significance of said low range group, converter means for deriving an analog signal indicative of the number stored in said low range group, means for biasing said converter means, and means for simultaneously changing the bias provided by said biasing means and adding to said converter means an analog signal indicative of the number stored in said high range element.

5. A dual range error decoder comprising a reversible binary counter having a plurality of normal range counting stages of successively increasing rank, a bias source, a plurality of impedances respectively connected between said source and each of said stages, an extended range counting stage connected with the highest rank stage of said normal range stages, an extended range impedance coupled with said extended range stage, switch means for coupling said extended range impedance with said bias source, means for changing the bias provided by said source, and means for synchronously actuating said switch means and said bias changing means.

6. A servo system comprising a reversible binary counter having a plurality of counting stages of successively increasing rank, summing means for establishing at an output terminal thereof an analog signal indicative of the number stored in said counter, a motor having a split control winding, means for coupling said terminal to one end of said winding, biasing means for maintaining a zero net signal in said winding when a predetermined number is stored in said counter, said biasing means including means for establishing a predetermined bias at the other end of said winding and means for establishing a predetermined bias at said output terminal, an extended range counter stage connected with the highest rank stage of said first mentioned stages, impedance means for establishing an analog signal indicative of a number corresponding to the rank of said extended range stage, switch means for coupling said impedance means with said output terminal, and means for simultaneously actuating said switch means and varying said biasing means.

7. A dual range digital to analog error decoder comprising counting means having a series of bistable counting stages adapted to receive a series of input pulses, means for deriving analog signals individual to each of said stages and respectively indicative of the stable condition of each stage, means for combining the signals derived from all but a predetermined number of said stages, switch means for coupling the analog means individual to said predetermined number of stages with said combining means, and means for selectively actuating said switch means.

8. A multi-range digital servo system comprising motor means for converting an analog signal to a mechanical displacement, means for producing a number of electrical pulses having a predetermined relation to said displacement, means for generating control pulses, electronic counter means for counting and storing the difference between said control pulses and said number of pulses, said counter means comprising a plurality of low range counter stages and at least one extended range counter stage, means for producing a low range analog signal proportional to the number stored in said low range stages, means for producing an extended range signal proportional to the number stored in said extended range stage, means for feeding said low range signal to said motor means, switch means for feeding said extended range signal to said motor means, program means for controlling the repetition rate of said control pulses, and means synchronized with said program means for actuating said switch means.

References Cited in the file of this patent

UNITED STATES PATENTS

| | | |
|---|---|---|
| 2,537,427 | Seid et al. | Jan. 9, 1951 |
| 2,711,499 | Lippel | June 21, 1953 |
| 2,727,194 | Seid | Dec. 13, 1955 |
| 2,775,727 | Kernahan et al. | Dec. 25, 1956 |